United States Patent [19]  [11] Patent Number: 4,822,675
Funkenbusch et al.  [45] Date of Patent: Apr. 18, 1989

[54] STABLE MAGNETO OPTIC RECORDING MEDIUM

[75] Inventors: Arnold W. Funkenbusch, White Bear Lake; David W. Siitari, Edina, both of Minn.

[73] Assignee: Minnesota Mining and Manufacturing Company, St. Paul, Minn.

[21] Appl. No.: 176,092

[22] Filed: Mar. 31, 1988

Related U.S. Application Data

[63] Continuation of Ser. No. 3,203, Jan. 14, 1987, abandoned.

[51] Int. Cl.$^4$ .......................... H01F 10/00; G11B 5/64
[52] U.S. Cl. .................................... 428/336; 365/122; 369/13; 369/288; 428/694; 428/900
[58] Field of Search ....................... 428/336, 694, 900; 365/122; 369/13, 288; 360/131, 134–135

[56] References Cited

U.S. PATENT DOCUMENTS

| | | | |
|---|---|---|---|
| 3,856,579 | 12/1974 | Allen et al. | 148/103 |
| 4,170,689 | 10/1979 | Katsui et al. | 428/457 |
| 4,544,239 | 10/1985 | Shone et al. | 350/376 |
| 4,567,116 | 1/1986 | Sawada et al. | 428/694 |
| 4,569,881 | 2/1986 | Freese et al. | 428/213 |
| 4,586,161 | 4/1986 | Skoda | 365/122 |
| 4,615,944 | 10/1986 | Gardner | 428/332 |
| 4,670,316 | 6/1987 | Kryder | 428/64 |

FOREIGN PATENT DOCUMENTS

| | | |
|---|---|---|
| 168046 | 1/1986 | European Pat. Off. |
| 184034 | 6/1986 | European Pat. Off. |
| 2569072A | 2/1986 | France |
| 74844 | 6/1981 | Japan |
| 84358 | 5/1984 | Japan |
| 60-231304 | 11/1985 | Japan |
| 15308 | 1/1986 | Japan |
| 34744 | 2/1986 | Japan |
| 48148 | 3/1986 | Japan |
| 1390563 | 4/1975 | United Kingdom |
| 2071696 | 9/1981 | United Kingdom |

OTHER PUBLICATIONS

Imamura, N., et al., "Magneto-Optical Recording on Amorphous Films," IEEE Transactions on Magnetics, vol. Mag-21, No. 5, Sep. 1985, pp. 1607–1612.
Kobayashi, M., et al., "Effects of Additive Elements on Corrosion Resistance of RE-TM Films," IEEE Translation Journal on Magnetics in Japan, vol. TJMJ-1, No. 5, Aug. 1985, pp. 527–533.
Aratani, K., et al., "Magnetic and Magneto-Optic Properties of TB-FeCo-Al Films," J. Appl. Phys. 57(1), Apr. 15, 1985, pp. 3903–3905.
Mimura, Y., et al., "Thermomagnetic Writing on Gd-Fe and Gd-Fe-Y Amorphous Films," Japanese Journal of Applied Physics, vol. 17, No. 8, Aug. 1978, pp. 1365–1369.

Primary Examiner—Paul J. Thibodeau
Attorney, Agent, or Firm—Donald M. Sell; Walter N. Kirn; Douglas B. Little

[57] ABSTRACT

Magneto-optic recording media have been made more resistant to corrosion by incorporating small amounts of tantalum and/or yttrium into the rare earth-transition metal active layer of the recording media. This improvement should help make magneto-optic media more reliable in the long term storage and retrieval of information.

9 Claims, 1 Drawing Sheet

STABLE MAGNETO OPTIC RECORDING MEDIUM

This is a continuation of application Ser. No. 003,203 filed Jan. 14, 1987, now abandoned.

TECHNICAL FIELD

This invention is related to amorphous thin film magneto optic recording media. More particularly, it pertains to the protection of the amorphous thin film alloy active layer in such media from deterioration by chemical contaminants or corrosion.

BACKGROUND

Magneto-optic recording media are also known by several other names: thermomagnetic media, erasable optical media, beam addressable files, and photo-magnetic memories. All of these terms apply to a storage medium or memory element which responds to radiant energy permitting the use of such energy sources as laser beams for both recording and interrogation. Such media modify the character of an incident polarized light beam so that the modification can be detected by an electronic device such as a photodiode.

This modification is usually a manifestation of either the Faraday effect or the Kerr effect on polarized light. The Faraday effect is the rotation of the polarization plane of polarized light which passes through certain magnetized media. The Kerr effect is the rotation of the plane of polarization of a light beam when it is reflected at the surface of certain magnetized media.

When a magnetizable amorphous film is deposited on a reflector, the magneto optic rotation is increased because the Faraday effect is added to the Kerr effect. The former effect rotates the plane of polarization of the light as it passes back and forth though the magneto-optic layer while the Kerr effect rotates it at the surface of the layer.

A change in orientation of polarization of the light is caused by the magneto-optical properties of the material in the bit or site on which the polarized light is incident. Thus, the Kerr effect, Faraday effect or a combination of these two, is used to effect the change in the plane of light polarization. The plane of polarization of the transmitted or reflected light beam is rotated through the characteristic rotation angle $\Theta$. For upward bit magnetization, it rotates $\Theta$ degrees and for downward magnetization $-\Theta$ degrees. The recorded data, usually in digital form represented by logic values of 1 or 0 depending on the direction of bit magnetization may be detected by reading the change in the intensity of light passing through or reflected from the individual bits, the intensity being responsive to the quantity of light which is rotated and the rotation angle.

The main parameters that characterize a magneto optic (MO) material are the angle of rotation, the coercive force ($H_c$), the Curie temperature and the compensation point temperature. The medium is generally comprised of a single element or multicomponent system where at least one of the components is an amorphous metal composition. Binary and ternary compositions are particularly suitable for these amorphous metal alloys. Suitable examples would be rare earth-transition metal (RE-TM) compositions, such as Gadolinium-cobalt (Gd-Co), Gadolinium-iron (Gd-Fe), Terbium-iron (Tb-Fe), Dysprosium-iron (Dy-Fe), Gd-Tb-Fe, Tb-Dy-Fe, Tb-Fe-Co, Terbium-iron-chromium (Tb-Fe-Cr), Gd-Fe-Bi (Bismuth), Gd-Fe-Sn (Tin), Gd-Fe-Co, Gd-Co-Bi, and Gd-Dy-Fe.

The susceptibility of Re-Tm alloys to corrosion is well known. When used as a thin film in MO disks, the alloy is usually protected from contact with the ambient atmosphere by surrounding it with dielectric layers, partially as an effort to prevent corrosion by water which may be aided by other materials (e.g., chlorides). The RE-TM alloy and surrounding dielectric layers are often deposited on a transparent substrate, e.g. transparent polymer such as polycarbonate or polymethylmethacrylate. Such protection prevents observable corrosion for short periods (several months) of time under ambient conditions. However, extensive lifetimes (5-10 years) without corrosion are required of optical disks.

Because the active MO layer is usually quite thin, once significant corrosion has occurred the corrosion sites can become apparent as transparent or bright spots on the recording medium where the active RE-TM alloy may have been disrupted or converted to transparent oxide, exposing the underlying reflector. The result of this corrosion is a loss of stored information. Over time, the corrosion sites grow and increase the amount of lost information.

Previous literature references to corrosion of MO media indicate that additions of titanium, platinum and other elements are effective in inhibiting corrosion in samples of bare MO media exposed to aqueous salt solutions (Imamura, N., et al., "Magneto-Optical Recording on Amorphous Films", *IEEE Transactions on Magnetics,* September 1985, p. 1607 and Kobayashi, et al., *IEEE Translation Journal on Magnetics in Japan,* August, 1985). However, the present inventors have found that complete multilayer disk constructions do not exhibit the same corrosion performance as bare MO films.

DISCLOSURE OF INVENTION

The problem of corrosion has been approached by modifying the RE-TM alloy composition through the addition of certain elements. The invention is summarized as a magneto optical recording medium comprising a substrate; a magnetizable rare-earth transition metal alloy layer which is protected from contact with ambient atmosphere by a layer or layers on all sides, one of which layers may be the substrate; and a reflective surface; wherein the magnetizable alloy comprises a combination of an iron-terbium alloy together with an added metal selected from the group consisting of yttrium, tantalum, and combinations thereof.

Both tantalum and yttrium have been shown to be effective in retarding corrosion, and both additions are made by adding the yttrium or tantalum to the source material (i.e., sputter target or targets) from which the components of the magnetizable RE-TM alloy layer originate. The addition of yttrium or tantalum has been shown to significantly reduce the occurence of local corrosion during testing of MO disks at accelerated aging conditions of 70° or 80° C. and 90% relative humidity. These accelerated aging tests are used to predict long term disk stability under normal operating and storage conditions.

During environmental testing at high humidity and high temperature, water penetrates the plastic substrate, resulting in local corrosion at locations where the protective dielectric layers may have tiny pinholes, cracks, or pores. These faults can result from minute deformities in the stamper or mold used to form the substrate.

Experiments have shown that the appearance of localized corrosion (pits or pinholes in the active MO layer) is strongly influenced by the presence of chlorine- or sulfur-containing compounds in the substrate or environment.

The addition of yttrium or tantalum in concentrations sufficient to reduce corrosion has only a small influence, if any at all, on the properties of the magnetizable alloy layer other than corrosion resistance. Therefore, the information storage capability of MO media made using the films of improved corrosion resistance is only slightly affected.

Many film substrates can be used. They may be formed of any material which is dimensionally stable, minimizing radial displacement variations during recording and playback. Semiconductors, insulators, or metals can be used. Suitable substrates include glass, spinel, quartz, sapphire, aluminum oxide, metals such as aluminum and copper, and polymers such as polymethyl-methacrylate (PMMA), polycarbonate, and polyester. The substrate is typically in the form of a disc.

The reflective surface may be a smooth, highly polished surface of the substrate itself (e.g., aluminum), or it may be the surface of a separate reflecting layer deposited by techniques known in the art such as vacuum vapor deposition. It is located within the recording medium construction so as to reflect light back through the magnetizable alloy layer. The reflective surface or layer usually has a reflectivity greater than about 50% (preferably 70%) at the recording wavelength. Deposited reflecting layers usually are about 50 to 500 nanometers thick. Useful as reflective surfaces or layers are copper, aluminum or gold.

DETAILED DESCRIPTION OF THE INVENTION

Figure 1:
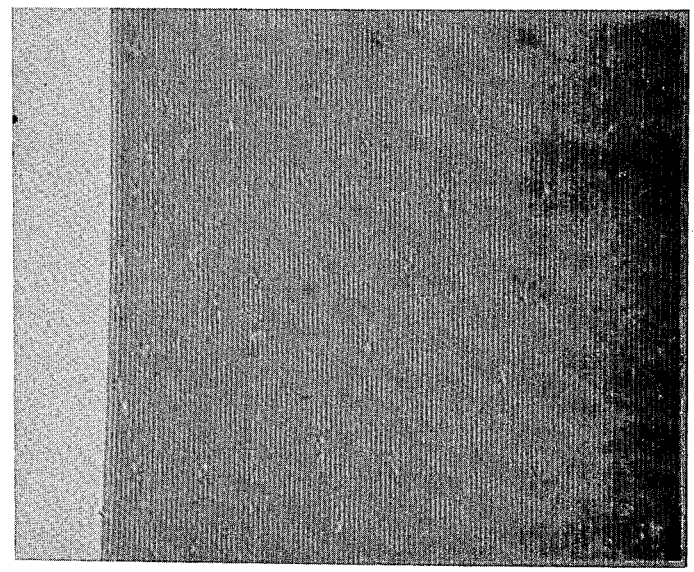
FIG. 1 is an optical photomicrograph of an MO disk of the present invention containing 2.5% tantalum, which disk had been exposed to conditions of 80° C. and 90% relative humidity for 434 hours, taken at 520×magnification. Corrosion sites are visible as light spots in FIG. 1.

The magnetizable RE-TM alloy layers in the media of this invention are generally between 5 and 200 nm (nanometers) thick. The concentration ranges of the components are usually as follows:

Iron =—balance
Terbium =—10-30 atom percent (preferably 15-30%)
Cobalt =—0-30 atom percent
Tantalum =—0.1-10 atom percent (preferably less than 5%)
Yttrium =—0.1-10 atom percent (preferably no more than 5%)

The RE-TM alloy is also generally characterized as amorphous, that is a noncrystalline solid which does not possess spatially periodic atomic arrangements. Amorphous materials have no long range atomic order. When analyzed by electron beam diffraction, amorphous alloys produce a broad diffraction line followed perhaps by a number of weak, broad lines. Such diffraction patterns with broad lines or halos are not easily assigned to a crystalline structure, although some localized atomic ordering on a very small scale may be present.

The RE-TM alloy layer may also be characterized as having a multiplicity of magnetic domains, preferably all of which are less than 500 angstroms in largest dimension. A domain refers to the smallest stable magnetizable region in the alloy; although, in common usage, a domain is a uniformly magnetized region of any size. Domain size, as used herein, means the greatest dimension of the domain measured in the plane of the RE-TM alloy layer.

A triode sputtering process is suitable for depositing the RE-TM films of this invention. The triode sputtering apparatus comprises a vacuum chamber containing a sputtering cathode target where the metal alloy is placed. The alloy sputters to provide an accumulation on the substrate which is placed on the substrate holder. The cathode target is water cooled, and the substrate can be made to rotate through an external drive means. A shutter is usually provided between the target and the sample to allow sputter cleaning of the target prior to deposition. The sputtering chamber itself is made of stainless steel.

In operation, the sputtering chamber is typically pumped down to some initial background pressure (e.g., $4.0 \times 10^{-7}$ Torr) after which the sputter gas (argon) is introduced. Typically, the target is cleaned by presputtering for about 60 seconds at a bias voltage of about 300 volts. The substrate is exposed to the flux of atoms from the target after the predetermined sputtering conditions have been reached.

The yttrium and tantalum additions were made by placing pieces of the desired addition on top of an Fe-Tb-Co target in a sputtering apparatus. The concentration of both yttrium and tantalum added to the sputtered RE-TM films was varied by varying the area of added pieces on top of the Fe-Tb-Co target. It is also possible to produce the desired alloy film by sputter deposition using a target which is an alloy of all the desired elements.

The rare earth-transition metal film is one component of a complete magneto-optic medium. Other elements are a rigid substrate and various transparent dielectric films and reflective metallic films. If the light beam addresses the magnetizable film from the substrate side (substrate incident medium), a substrate of a transparent plastic (polycarbonate, polymethylmethacrylate, etc.) or glass can be used. If the light beam addresses the rare earth-transition metal from the side opposite the substrate (air incident medium) the substrate may be an opaque and/or reflective material such as aluminum, copper, or other metals and semiconductors. In both cases (substrate and air incident) the substrate provides a rigid base for material deposition and may contain physical features (such as grooves) for laser beam tracking.

Thin transparent dielectric layers (typically 10-200 nanometers (nm) thick) may be positioned on either or both sides of the RE-TM film. The dielectric layers can be deposited by vacuum deposition techniques such as sputtering or evaporation. These films serve the dual role of enhancing the optical signal from the RE-TM film and protecting the RE-TM film from corrosive and oxidative environments such a water, water vapor, air, and corrosion enhancing chemicals such as chlorine and sulfur. Suitable materials for the transparent dielectric are: silicon dioxide, silicon monoxide, aluminum oxide, and aluminum nitride. Use of other materials is also possible. The criteria for selecting them are that they should have transparency, an index of refraction greater than about 1.2 and good chemical stability (i.e. not degraded over time or by chemicals likely to be encountered).

If the MO medium is air incident and a non-reflective substrate is used and for substrate incident media, a film of reflective material (e.g. metals such as aluminum, copper, gold, or silver) may be used to reflect light which has been transmitted through the RE-TM film back through the RE-TM film. By this means, the MO signal is enhanced.

It is desirable to protect MO media with a thick transparent protective covering or defocusing layer. This protective layer helps in preventing damage to the medium through handling and leaves fingerprints and dust particles on the surface out of focus relative to the lens apparatus which reads the light beam reflected from the RE-TM layer. The defocusing layer is usually at least 1.2 mm thick. In the substrate incident construction, the substrate acts as the protective covering.

Despite the use of protective films and substrates to keep corrosive chemicals such as water, water vapor, chlorine, and sulfur from coming in contact with the RE-TM film, corrosion of the rare earth-transition metal film is observed. This corrosion takes place at sites where the protective measures break down due to water penetration through the protective films and substrates. This penetration may occur due to a diffusive process or through defects, cracks, or pinholes. By use of tantalum and/or yttrium additions to the rare earth-transition metal film, the severity of corrosion can be greatly suppressed.

The invention will be further clarified by considering the following examples which are intended to be purely exemplary.

EXAMPLE I

Six deposition runs were made using identical conditions with the exception that in two of the runs no yttrium was added to the FeTbCo film and in four runs an identical amount of yttrium was added to the FeTbCo films. For each run two injection molded, grooved polycarbonate substrates and two glass slides were loaded into a vacuum chamber which was evacuated to about $5 \times 10^{-7}$ torr. The sample rotating platen or planetary was used to rotate the disks about the chamber center and their axes during deposition. First a 525 Angstrom (Å) thick SiOx film was deposited at 4.5 Å/sec using a resistance heated evaporation boat filled with silicon monoxide powder. Then a 330 Å thick film of FeTbCo or FeTbCoY was deposited at about 3 Å/second by magnetically enhanced triode sputtering in argon gas. The source material (target) for the sputtering cathode was 51 mm×152 mm and consisted of bars of iron, cobalt, and terbium whose relative size had been selected to give films of good magneto-optic properties. The yttrium addition was made by placing two disks of yttrium 6.4 mm in diameter on top of the iron in the triode target. Based on previous ICP (Inductively Coupled Plasma) experiments, the approximate atomic composition of the FeTbCo films was Fe=65%, Co=13%, Tb=22%. For the FeTbCoY films the approximate atomic composition was Fe=61%, Co=13%, Tb=22%, Y=4%. During sputter deposition the argon flow rate was 30 sccm (standard cubic centimeters per minute) and the chamber pressure was $1.3 \times 10^{-3}$ torr. Other parameters were: Target voltage=200 volts, target current =1.25 Amps, emitter current=33 Amps, plasma voltage=68 volts, plasma current=5.9 Amps. Following deposition of the metal alloy films, a 400 Å thick film of SiOx was deposited at about 2.9 Å/second using the resistance heated evaporation boat. Finally, a 1400 Å thick film of aluminum +2 atomic percent chromium was deposited at about 8 Å/second using a DC planar magnetron sputtering source. Argon flow was 34sccm, pressure was about $1 \times 10^{-3}$ torr, target current was 10 Amps, and target voltage was 520 volts.

Disks from these six runs were tested using an optical recorder to determine carrier to noise ratio (CNR). The CNR for the yttrium-doped and yttrium-free disks were both good. The average CNR obtained using a 6 mw laser write power was 51 dB for the yttrium-free disks and 52 dB for the yttrium-containing disks.

One disk from each run was exposed to 70° C., 90% relative humidity corrosion testing which was interrupted at 397 hours and 536 hours to make optical microscopy studies of corrosion defect formation and growth. The number of defect sites in an arbitary area on the disks was determined. The average number of defect sites per disk in the arbitary area after 397 hours was 150 for the disks containing no yttrium and 23 for the disks containing yttrium. After 536 hours, the disks without yttrium had an average of 213 defects and the disks with yttrium had 74 defect. These results show that yttrium greatly reduced the formation of corrosion defects.

EXAMPLE II

The beneficial effects of yttrium addition are further shown through the results of a deposition run in which two MO disks were made of atomic composition 23% Tb, 14 Co, and 3.6% Y, the remainder being Fe. Three base line deposition runs were also carried out without yttrium addition for the purpose of comparison. Their atomic compositions were as follows: run 460: 21.8% Tb, 12.9% Co, remainder Fe; run 462: 21.4% Tb, 13% Co, remainder Fe; and run 467 22.8% Tb, 13.5% Co, remainder Fe. These four-layer media were made under conditions identical to Example I. All the disks were exposed to an environment of 70° C. and 90% relative humidity and periodically removed and checked by optical microscopy and by using an optical laser recorder to determine the ratio of the number of bit errors to bits of recorded data (i.e. Bit Error Rate or BER). Over the total test time of more than 400 hours, the BER of the inventive yttrium doped media increased only from about $3 \times 10^{-5}$ to about $1 \times 10^{-4}$. On the other hand, while the disks of runs No. 462 and 467 had about the same initial BER as the inventive media disks, the BER for run 467 increased to $4 \times 10^{-4}$ in about 200 hours and the BER for run 462 increased to $4 \times 10^{-4}$ in about 380 hours. The disk of run 460 had an initial BER of about $2 \times 10^{-4}$ which increased to $4 \times 10^{-4}$ in about 120 hours. This dramatic reduction in the rate of increase in BER with time under severe conditions can be attributed to protection from local corrosion, and this reduced local corrosion in the yttrium doped disks was confirmed by optical microscopy.

EXAMPLE III

Seven injection molded grooved polycarbonate disks 130mm in diameter and 3 glass slides were mounted in a vacuum deposition system which was evacuated to $<2\times10^{-7}$ torr. The vacuum deposition system was equipped with a planetary which allowed the disks to be rotated both about their axes and an axis at the vacuum chamber center in order to ensure uniform film depositions. First an SiOx film 500 Å in thickness was deposited at a rate of about 4 Å/sec using a resistance heated evaporation boat filled with silicon monoxide powder. A 300 Å thick film consisting of an alloy of Fe, Co, Tb and Ta was deposited by triode sputtering at about 1.7 Å/sec using a magnetically enhanced sputter source. The sputter target was 51 mm×381 mm and comprised 68% Fe, 8% Co, and 24% Tb (atomic percent) onto which a piece of tantalum 25 mm×13 mm had been placed. During deposition the argon sputtering gas flow was 220sccm and the chamber pressure was $1.3\times10^{-3}$ torr. The following were the source operating conditions: Target voltage=500 volts, target current=2.2 Amps, plasma voltage=80 volts, plasma current=5 amps, emitter current=34 amps. After depositing the FeTbCoTa alloy, the system was re-evacuated to $8\times10^{-7}$ torr and a 300 Å thick film of SiOx was deposited using the resistance heated evaporation boat filled with silicon monoxide powder. Finally, a 1500 Å thick film of aluminum +2 atomic percent chromium was deposited at about 3.6 Å per second using a DC planar magnetron sputter source. The argon flow rate was 40 sccm and the chamber pressure was $8\times10^{-4}$ torr. The magnetron sputtering target voltage and current were 700 volts and 2.2 amps.

The composition of the FeTbCoTa film which had been deposited on the glass slides during the experiment was determined using ICP analysis. The result in atomic percent was:

Fe:=68.1%
Tb:=22.0%
Co:=7.9%
Ta:=2.0%

Two methods were used in determining the influence of various tantalum concentrations on the corrosion resistance of Fe-Tb-Co alloys.

EXAMPLE IV

In the first method, films 1000 angstroms thick were deposited on polymethylmethacrylate substrates which had been coated with a 500Å thick layer of SiOx. Their electrochemical polarization curves were determined in a nitrogen saturated 0.1 N NaCl water solution in accordance with the ASTM Standard Practice for Standard Reference Method for Making Potentiostatic and Potentiodynamic Anodic Polarization Measurements (ASTM G 5-82) using a scan rate of 2mV/sec. This is a standard method used to measure the corrosion resistance of materials. The apparatus used for controlling and changing the voltage potential was an EG & G Princeton Applied Research Potentiostat/Galvanostat Model 273, and the reference electrode used was a saturated calomel reference electrode.

The alloys tested by this method were the same except that two of the three alloys had 2.5 and 5 atom % tantalum, respectively, while the third, control, contained no tantalum. The tantalum addition significantly moved the corrosion potential (the voltage for which corrosion current is zero) in a positive direction. The corrosion potential for the control was about $-710$ mV, while the corrosion potential for the 2.5% Ta alloy was about $-640$ mV relative to a saturated calomel electrode. This more positive voltage represents a reduced driving force for the corrosion reaction. In addition, the curves of voltage potential versus current showed that the tantalum doped alloys experienced significantly reduced corrosion currents as voltage was increased. For example, at a voltage of about $-450$ mV corrosion current for the inventive alloys was reduced over that for the undoped control by a factor of more than 100.

EXAMPLE V

The second test for determining the influence of tantalum concentrations on corrosion resistance was to make full construction MO media which incorporated Fe-Tb-Co-Ta films as made in Example III. These media were exposed to 80° C. and 90% relative humidity for 434 hours, and the extent of corrosion was determined by optical microscopy. The full construction media consisted of: an injection molded polycarbonate substrate, a 500 angstrom thick layer of $SiO_x$, a 300 angstrom thick layer of Fe-Tb-Co-Ta alloy, 400 angstrom thick $SiO_x$ layer and 1500 angstrom thick layer of Al-2% Cr reflective layer, a quadrilayer medium of the substrate incident structure. Corrosion sites were found to occur at defects and scratches transferred to the MO disks during molding. Therefore, it was possible to locate the same defects in disks of various tantalum levels and to locate the same defects from the molding process on different disks made on the same molding equipment. Comparison of these identical areas showed that the number and size of corrosion sites was significantly reduced by the presence of tantalum.

Figure 2:
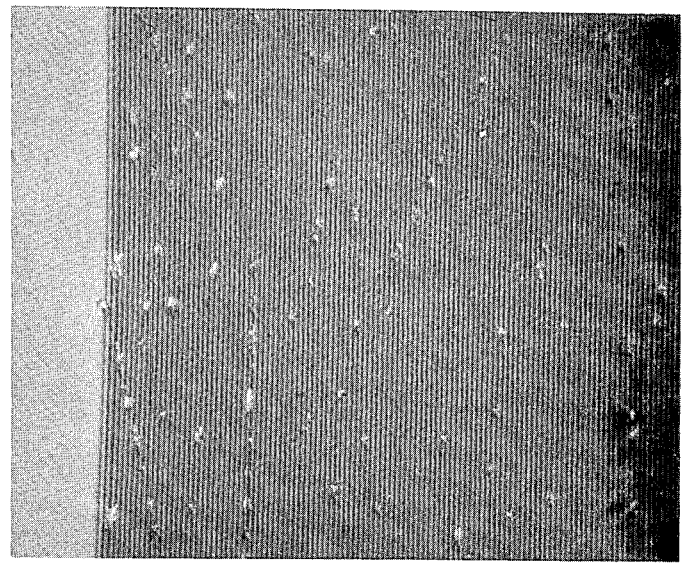
FIG. 2 is an optical photomicrograph (taken at 520×magnification) of another MO disk, identical to the disk in FIG. 1 and made in the same molding equipment, except that the magnetizable RE-TM alloy contained no tantalum. The photomicrograph was taken at the same area on the disk as was used for FIG. 1, so that it would be exposed to the same minor defects and scratches which may have been transferred from the molding equipment, and the environmental condition to which the disk was exposed were the same (i.e., 80° C. and 90% relative humidity for 434 hours). The corrosion sites are plainly visible as light spots in FIG. 2. The number and size of corrosion sites in FIG. 2 are much larger than in FIG. 1.

This is apparent by comparing FIGS. 1 and 2 which represent the same corresponding area on an inventive disk and a control disk having no tantalum in the RE-TM alloy, respectively. The inventive disk of FIG. 1 shows far fewer corrosion sites, and those which are apparent are smaller than those in FIG. 2.

The beneficial effects of tantalum would be meaningless if an MO medium with good magneto optic properties could not be produced. Therefore, MO disks of various tantalum concentrations were tested to determine the carrier-to-noise ratio (CNR) and threshold write laser power (laser power at which significant CNR is obtained). The results showed that increasing tantalum concentration reduced threshold write power somewhat and also reduced CNR a little. However, in all of the samples, the CNR was acceptable. CNR for the control disk without tantalum was about 53 decibels (dB), while the CNR for the 2.5% tantalum doped sample was about 52 dB and for a 3.8% Ta doped sample about 50 dB.

While certain representative embodiments and details have been shown for the purpose of illustrating the invention, it will be apparent to those skilled in this art that various changes and modifications may be made in this invention without departing from its true spirit or scope which is indicated by the following claims.

What is claimed is:

1. A magneto-optical recording medium comprising a substrate containing an element selected from the group consisting of sulfur and chlorine, a magnetizable rare earth-transition metal alloy layer on the substrate which alloy layer is protected from contact with the ambient atmosphere by a layer or layers on all sides, and a reflective surface located to reflect light through the magnetizable alloy layer, wherein the magnetizable alloy comprises a combination of an iron-terbium alloy and an added metal selected from the group consisting of yttrium, tantalum, and combinations thereof.

2. The magneto-optical recording medium of claim 1 wherein the rare earth-transition metal alloy contains cobalt.

3. The magneto-optical recording medium of claim 1 wherein the rare earth-transition metal alloy is amorphous.

4. The magneto-optical recording medium of claim 1 wherein the concentration of yttrium in the alloy is no more than 5 atom percent, and the concentration of tantalum in the alloy is no more than 5 atom percent.

5. The magneto-optical recording medium of claim 1 wherein the thickness of the magnetizable rare earth-transition metal alloy layer is between 50 and 2000 angstroms.

6. A magneto-optical recording medium comprising a substrate containing an element selected from the group consisting of sulfur and chlorine, a magnetizable rare earth-transition metal alloy layer on the substrate which alloy layer is protected from contact with the ambient atmosphere by a layer or layers on all sides, and a reflective surface located to reflect light through the magnetizable alloy layer, wherein the magnetizable alloy comprises an alloy of iron, terbium and yttrium.

7. The magneto-optical recording medium of claim 6 wherein the magnetizable alloy comprises iron, terbium, cobalt and yttrium.

8. A magneto-optical recording medium comprising a substrate containing an element selected from the group consisting of sulfur and chlorine, a magnetizable rare earth-transition metal alloy layer on the substrate which alloy layer is protected from contact with the ambient atmosphere by a layer or layers on all sides, and a reflective surface located to reflect light through the magnetizable alloy layer, wherein the magnetizable alloy comprises an alloy of iron, terbium and tantalum.

9. The magneto-optical recording medium of claim 8 wherein the magnetizable alloy comprises iron, terbium, cobalt, tantalum.

* * * * *